(12) United States Patent
Hille

(10) Patent No.: US 7,398,428 B2
(45) Date of Patent: Jul. 8, 2008

(54) DIAGNOSTIC TOOL WITH ETHERNET CAPABILITY

(75) Inventor: David G. Hille, Bursh Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 10/935,550

(22) Filed: Sep. 7, 2004

(65) Prior Publication Data
US 2006/0053335 A1 Mar. 9, 2006

(51) Int. Cl.
G06F 11/00 (2006.01)
(52) U.S. Cl. .......................................... 714/44; 714/56
(58) Field of Classification Search .................. 714/44, 714/56; 702/122
See application file for complete search history.

(56) References Cited

U.S. PATENT DOCUMENTS

| | | | |
|---|---|---|---|
| 5,724,510 A | 3/1998 | Arndt et al. | |
| 5,917,808 A * | 6/1999 | Kosbab | 370/254 |
| 6,101,499 A | 8/2000 | Ford et al. | |
| 6,400,462 B1 * | 6/2002 | Hille | 358/1.14 |
| 6,532,217 B1 | 3/2003 | Alkhatib et al. | |
| 7,167,922 B2 * | 1/2007 | Narayanan | 709/242 |
| 7,219,030 B2 * | 5/2007 | Ohtani | 702/122 |
| 2002/0062364 A1 * | 5/2002 | Watanabe | 709/223 |
| 2002/0064255 A1 * | 5/2002 | Mohammadian et al. | 379/21 |
| 2003/0028826 A1 * | 2/2003 | Balluff | 714/44 |
| 2003/0065767 A1 * | 4/2003 | Pardhy et al. | 709/224 |
| 2003/0200330 A1 * | 10/2003 | Oelke et al. | 709/238 |
| 2004/0085900 A1 * | 5/2004 | Nishio | 370/230 |
| 2004/0207866 A1 * | 10/2004 | Heiney et al. | 358/1.15 |
| 2004/0210583 A1 * | 10/2004 | Enko et al. | 707/10 |
| 2006/0090093 A1 * | 4/2006 | Goedde et al. | 714/4 |

OTHER PUBLICATIONS

Deering, S. Host Extensions for IP Multicasting. Aug. 1989. Stanford University. [retrieved on: Mar. 12, 2007]. Retrieved from the Internet: <URL: http://www.faqs.org/rfcs/rfc1112.html>. pp. 11-15.*

LA Nchecker 100 Handeld Ethernet Analyzer, LA NCHECKER 100/DS/ACO/05-03/AE, Available from Acterna, 12410 Milestone Center Drive, Germantown, Maryland 20876-7100 USA Copyright May 2003.

Acterna FST-2802 Testp Gigabit Ethernet Services Module, FST2802/DS/ACC/06-02/AE/ACT00287, Available from Acterna, 20400 Observation Drive, Germantown, Maryland 20876-4023 USA Copyright Jun. 2002.

Handheld network analyzers, Network World, Jul. 1, 2002, Available at http://www.nwfusion.com/reviews/2002/0701rev.html. Copyright Jul. 1, 2002.

* cited by examiner

Primary Examiner—Scott T. Baderman
Assistant Examiner—Paul F Contino

(57) ABSTRACT

Ethernet capability of a device under test is tested. A diagnostic tool is connected to the device under test. Menus displayed by the diagnostic tool are used to select an Ethernet test. The diagnostic tool discovers network settings of the device under test. Then the diagnostic tool configures an Ethernet connection between the diagnostic tool and the device under test.

23 Claims, 9 Drawing Sheets

US 7,398,428 B2

DIAGNOSTIC TOOL WITH ETHERNET CAPABILITY

BACKGROUND

Stores receive millions of dollars of returns of products. Sometimes the returns result from defective products. Other times the returns result from customer dissatisfaction with a product despite no product defect. If a product is defective, the product is generally returned to the manufacturer. If the product is not defective, it is advantageous to both the stores and the manufacturer if the product can be resold without returning the product to the manufacturer.

Before reselling a returned product, it is desirable that a store be able to test the product to assure proper operation. For example, Hewlett-Packard Company provides a diagnostic tool to stores that allow stores to perform tests to aid in the determination of whether returned printers are faulty.

Many printers include the capability to be directly connected to a network such as an Ethernet network. Currently available diagnostic tools do not include the capability to perform simple and efficient field testing for Ethernet functionality. Therefore, to test Ethernet functionality of a printer, it is typically required to connect the Ethernet port of the printer to the Ethernet port of a personal computer. The network settings of the personal computer need to be configured to properly communicate with the printer.

For example, a printer under test can be in two general states depending upon how a customer has configured the printer. For example, the printer can be configured in a "Manual Mode", so that all parameters such as IP address, Subnet Masks, and Gateways need to be set manually by a user. Alternatively, the printer can be configured in "Automatic Mode", in which the printer relies on a server connected to the network to send an IP address and other appropriate configuration settings to the printer.

When the printer is in manual mode, configuration of the network settings requires a user to know the internet protocol (IP) address of the printer. When the printer is in automatic mode, the user is required to configure the printer with a static IP address. Once the personal computer and the printer are configured correctly, the user causes the personal computer to send a print job directly to the printer. The configuration process described above requires a user to have a significant amount of familiarity with networking in order to configure the printer and perform testing.

SUMMARY OF THE INVENTION

In accordance with embodiments of the present invention, Ethernet capability of a device under test is tested. A diagnostic tool is connected to the device under test. Menus displayed by the diagnostic tool are used to select an Ethernet test. The diagnostic tool discovers network settings of the device under test. Then the diagnostic tool configures an Ethernet connection between the diagnostic tool and the device under test.

DESCRIPTION OF THE EMBODIMENT

Figure 1:
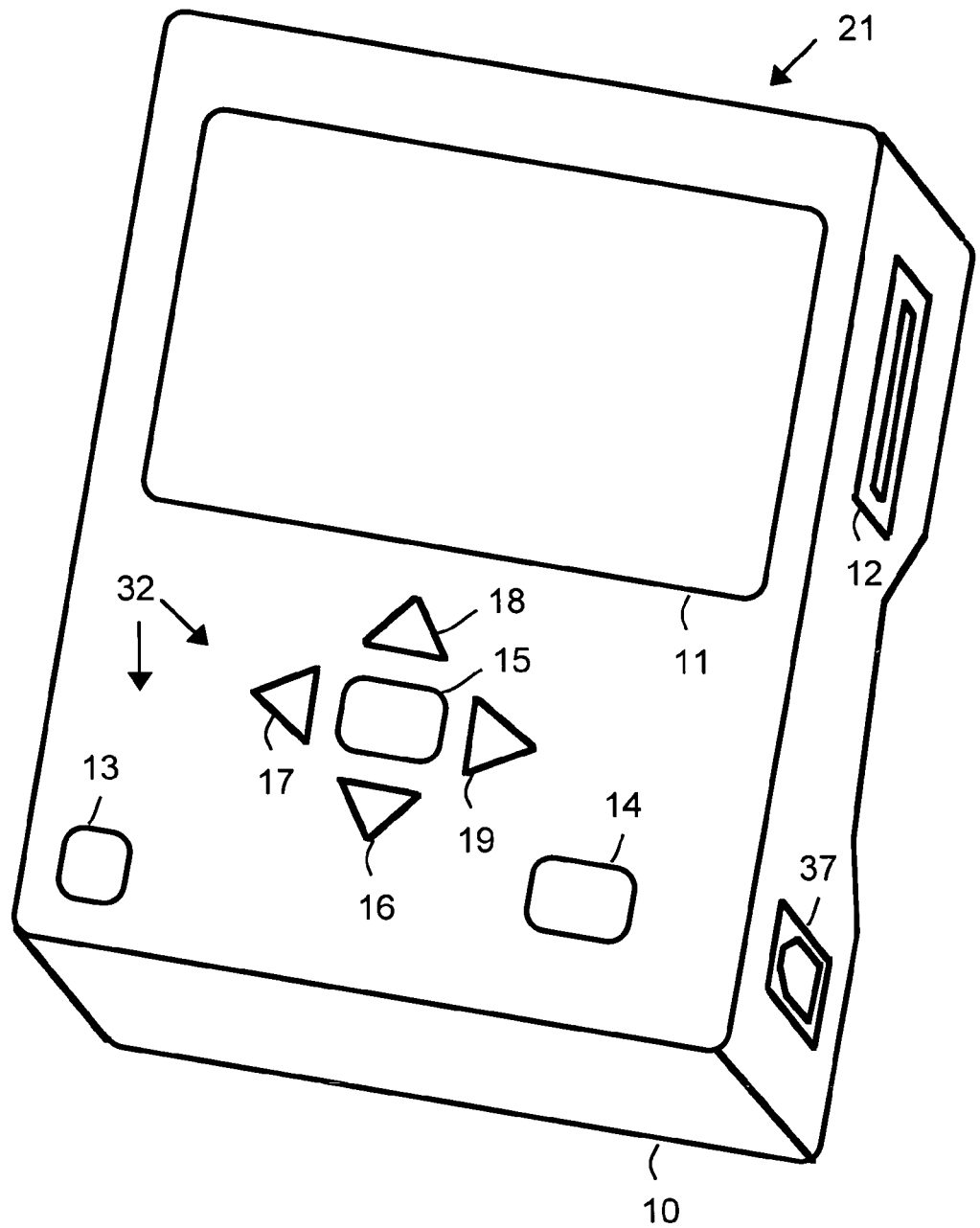
FIG. 1 and FIG. 2 are simplified diagrams of a handheld diagnostic tool that performs Ethernet testing in accordance with an embodiment of the present invention.

FIG. 1 shows a simplified diagram of a diagnostic tool 10 that is used to test a device under test (DUT). The diagnostic tool 10 includes a display 11, a universal serial bus (USB) slave connector 37, and another connector 12. Diagnostic tool 10 also can include, for example, additional connectors and/or the ability to perform wireless communication. For example, display 11 is a liquid crystal display (LCD). A keypad 32 for diagnostic tool 10 includes, for example, a power key 13, a menu key 14, a selection key 15, a direction key 16, a direction key 17, a direction key 18 and a direction key 19.

Figure 2:
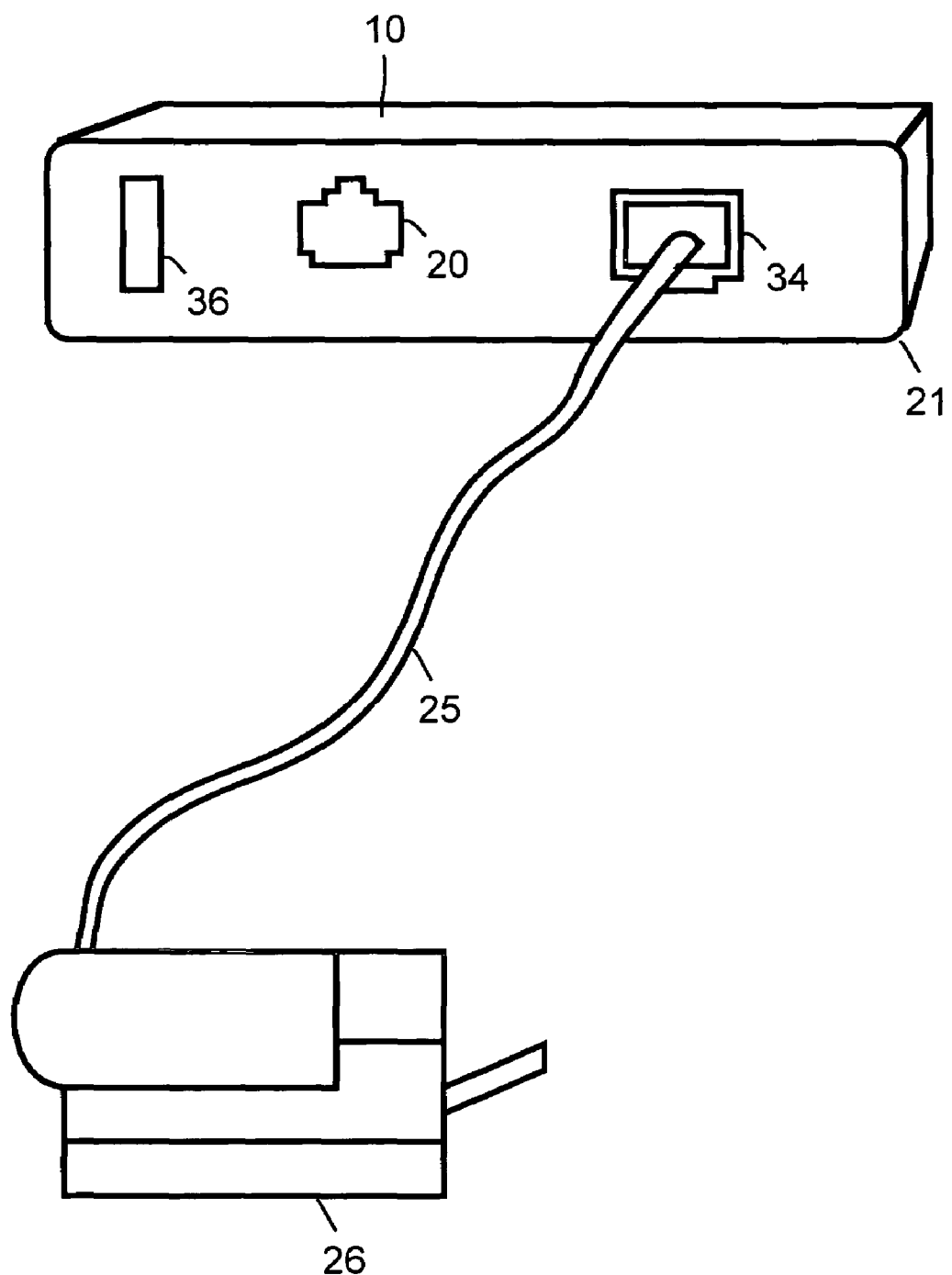

A top region 21 of diagnostic tool 10 contains additional connectors. For example, as shown in FIG. 2, top region 21 of diagnostic tool 10 contains a USB host connector 36, a registered jack (RJ)-45 Ethernet connector 34 and a telephone line connector 20. The telephone line connector may be for analog integrated services digital network (ISDN), digital proprietary protocols, fax communication or IP protocol transmissions. A device under test can be connected to diagnostic tool 10 for testing. For example, FIG. 2 shows a printer 26 connected to Ethernet connector 34 through an Ethernet cable 25. Below, printer 26 connected to Ethernet connector 34 is used as an exemplary device under test. As will be understood by persons of ordinary skill in the art, the invention is applicable to other types of devices that can be connected to diagnostic tool 10 via Ethernet or other wired or wireless connection protocols.

Figure 3:
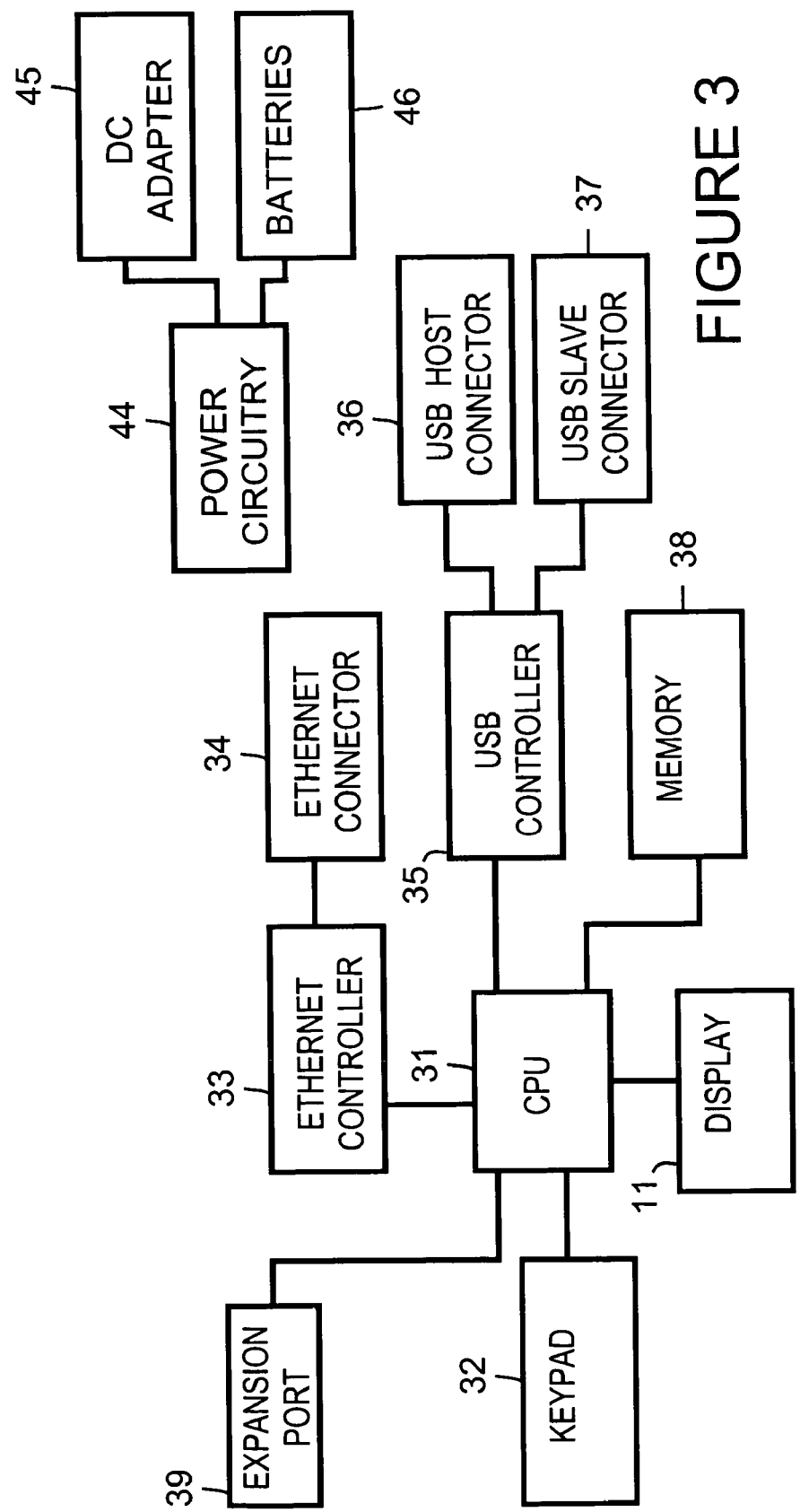
FIG. 3 is a simplified block diagram of the handheld diagnostic tool shown in FIG. 1 in accordance with an embodiment of the present invention.

FIG. 3 shows a simplified block diagram for diagnostic tool 10. A central processing unit (CPU) 31 interfaces with keypad 32, an Ethernet controller 33, a universal serial bus (USB) controller 35, memory 38, display 11 and an expansion port 39. USB controller 35 controls communication over USB host connector 36 and USB slave connector 37. Ethernet controller 33 controls communication over Ethernet connector 34. Ethernet controller 33 and Ethernet connector 34 are referred to collectively as Ethernet hardware (HW).

CPU 31 executes programming within memory 38 to control operation of diagnostic tool 10. A user can use keypad 32 to access and interact with menus displayed on display 11. Power circuitry 44 provides power to the components of diagnostic tool 10. Power is supplied to power circuitry 44, for example, by a direct current (DC) adapter 45 or batteries 46. For example, batteries 46 consist of four AA batteries. Power circuitry 44 generates, for example, a five-volt power signal and a 3.3 volt power signal.

Figure 4:
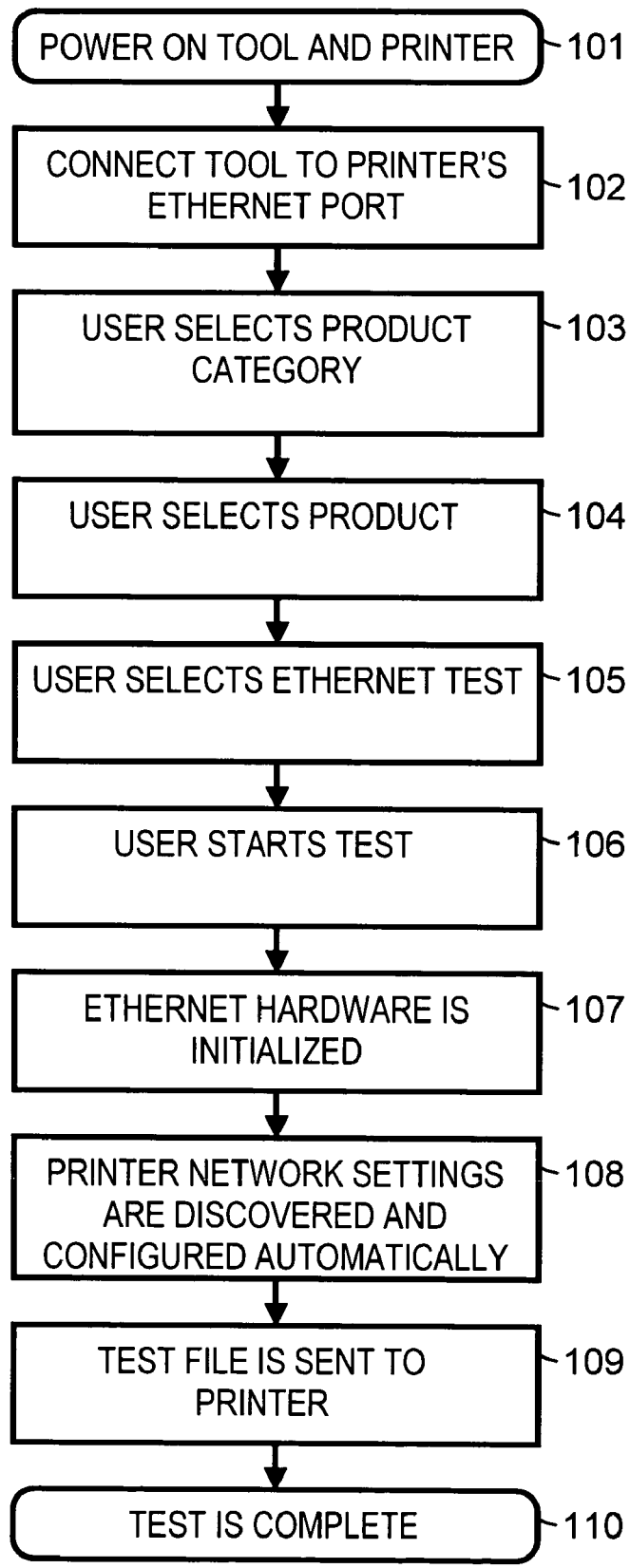
FIG. 4 is a simplified flow chart that illustrates the process of performing Ethernet testing using the handheld diagnostic tool shown in FIGS. 1 and 2.

FIG. 4 is a simplified flow chart that illustrates the process of performing Ethernet testing using handheld diagnostic tool 10. In a block 101, the user powers on diagnostic tool 10 and printer 26. In a block 102, diagnostic tool 10 is connected to an Ethernet port of printer 26 using an Ethernet cable 25, as shown in FIG. 2. In a block 103, using a select category menu on display 11 of diagnostic tool 10, the user selects a product category.

Figure 5:
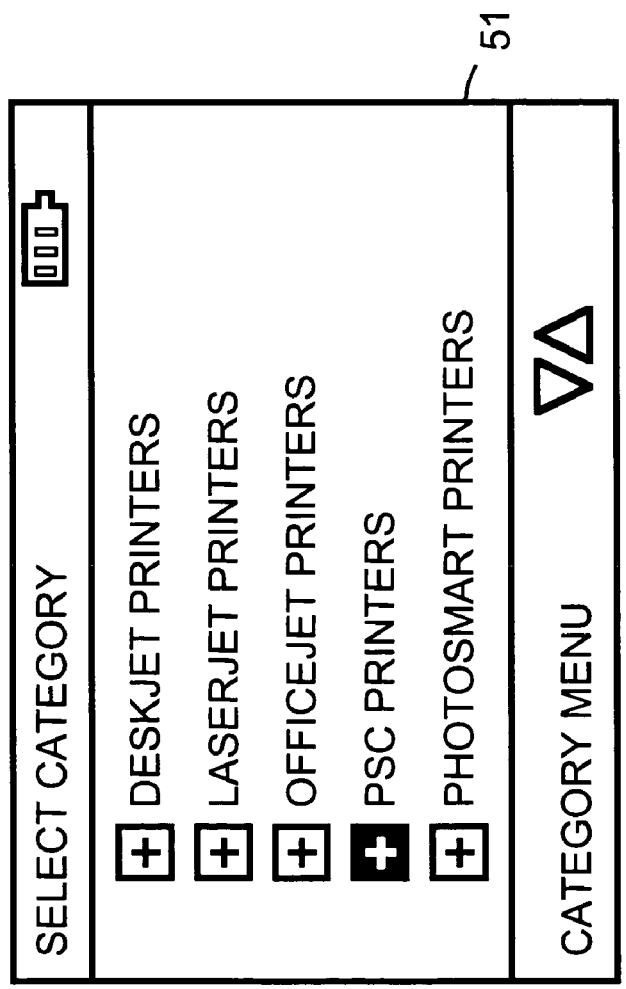
FIG. 5, FIG. 6, FIG. 7 and FIG. 8 show example simplified screens displayed on a display of the handheld diagnostic tool shown in FIG. 1 in accordance with an embodiment of the present invention.

For example, FIG. 5 shows a select category menu 51 as displayed on display 11 of diagnostic tool 10. A user can use select category menu 51 to select a product category on which to perform tests. Selections on select category menu 51 is controlled using direction key 16 and direction key 18 (shown in FIG. 1). In FIG. 5, the marker for "PSC printers" is highlighted and can be selected by the user pressing selection key 15 (shown in FIG. 1).

In a block 104 shown in FIG. 4, the user, after having selecting a product category, uses a select product menu on display 11 of diagnostic tool 10, to select a product.

Figure 6:
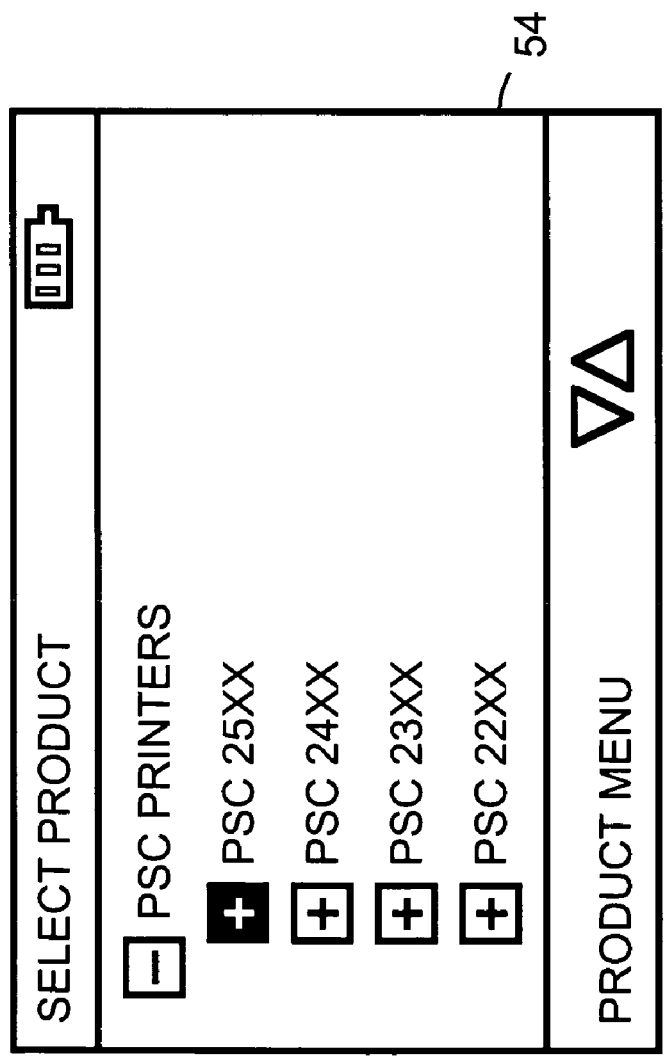

For example, FIG. 6 shows a select product menu 54 as displayed on display 11. The user can use select product menu 54 to select a product on which to perform tests. Product selection on select product menu 54 is controlled using direction key 16 and direction key 18 (shown in FIG. 1). In FIG. 6, the marker for "PSC 25XX" series printers is highlighted and can be selected by the user pressing selection key 15 (shown in FIG. 1).

In a block 105 shown in FIG. 4, the user, after having selecting a product, uses a select test menu on display 11 of diagnostic tool 10, to select a test.

Figure 7:
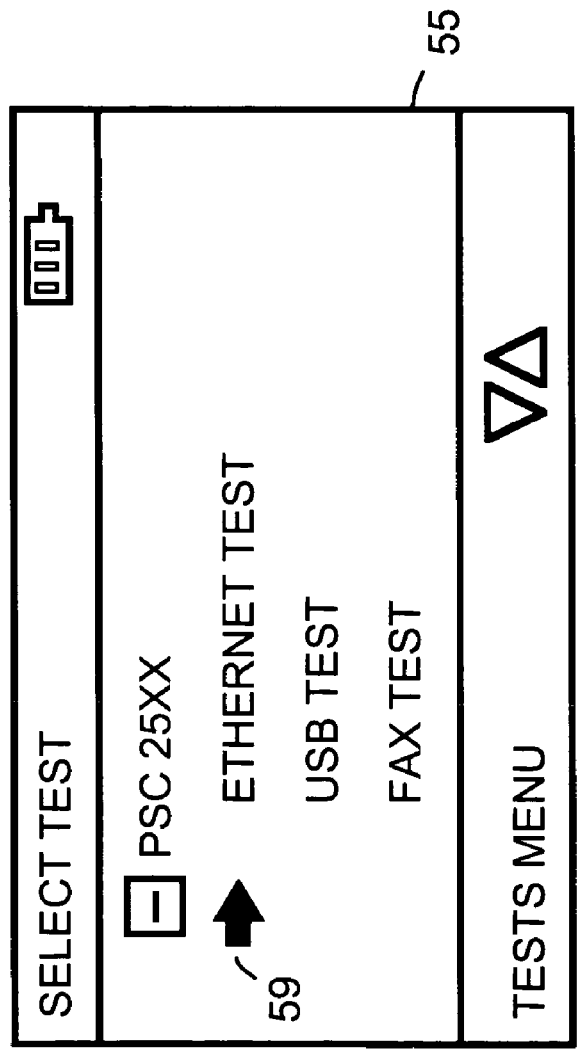

For example, FIG. 7 shows a select test menu 55 as displayed on display 11. The user can use select test menu 55 to select a test to be performed. The user controls test selection using direction key 16 and direction key 18 (shown in FIG. 1). In FIG. 7, "Ethernet test" is indicated by an arrow 59 and can be selected by the user pressing selection key 15 (shown in FIG. 1).

Figure 8:
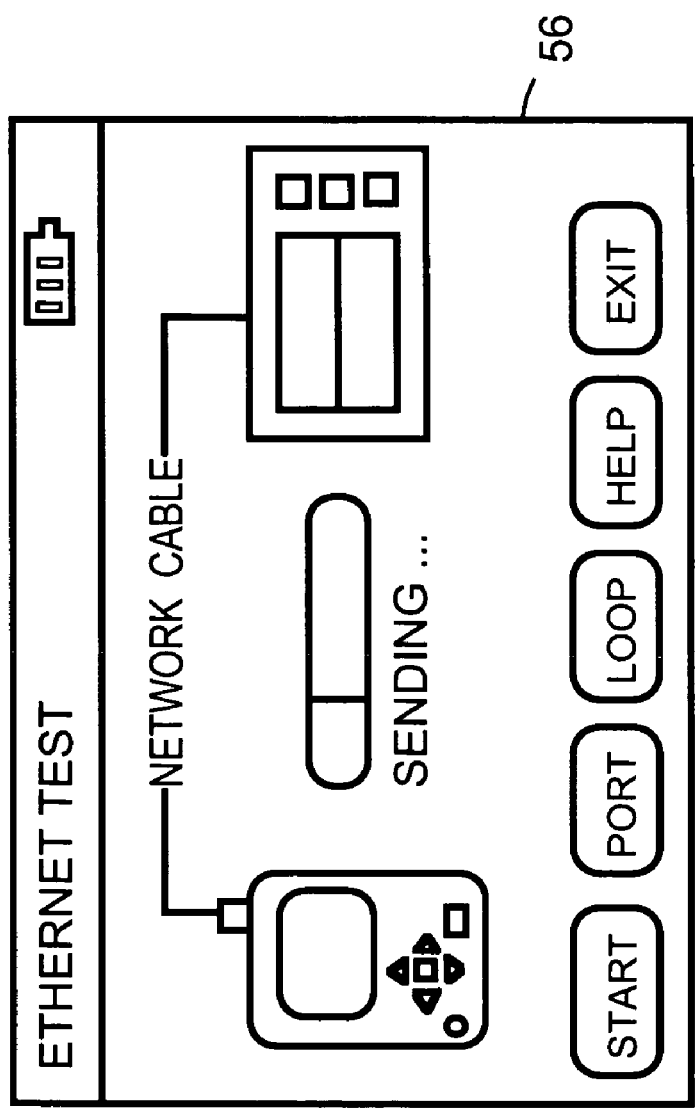

In a block 106, shown in FIG. 4, after selecting a test, the user starts the test, for example, using an Ethernet test menu. For example, FIG. 8 shows an Ethernet test menu 56 as displayed on display 11.

In a block 107, Ethernet hardware within diagnostic tool 10 is initialized by diagnostic tool 10. In a block 108, network settings for printer 26 are discovered and configured automatically by diagnostic tool 10. In a block 109, a test file is sent to printer 26. A user can monitor progress of the test through Ethernet test menu 56 displayed on display 11. For example, FIG. 8 shows Ethernet test menu 56 as displayed on display 11 when an Ethernet test is performed. The graphics give the user feedback on the progress of the Ethernet test. In a block 110, the test is complete.

Figure 9:
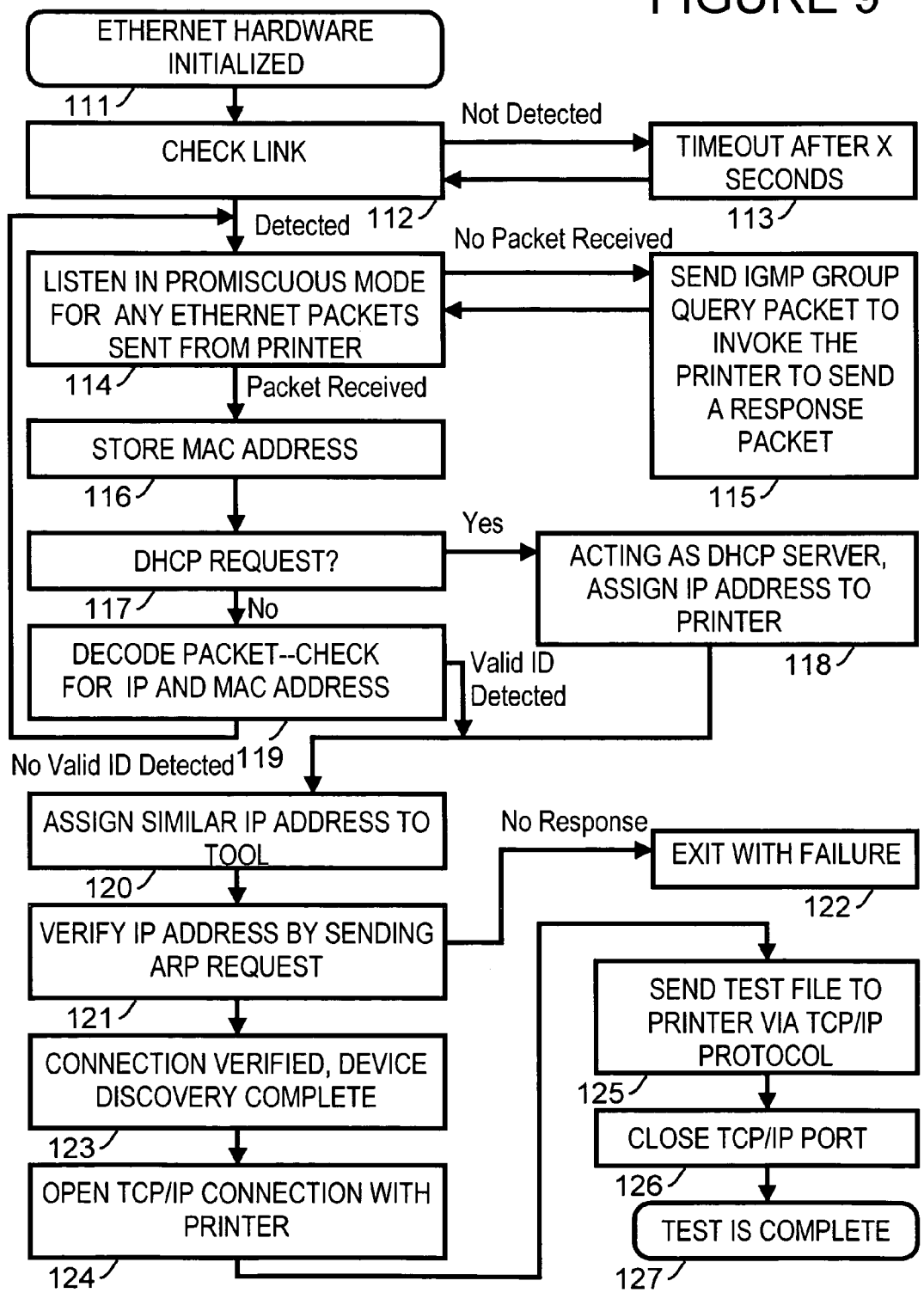
FIG. 9 is a simplified flow chart that illustrates activity within the handheld diagnostic tool, shown in FIG. 1, during performance of Ethernet testing, in accordance with an embodiment of the present invention.

FIG. 9 is a simplified flow chart that illustrates activity within handheld diagnostic tool 10 during performance of Ethernet testing. In a block 111, Ethernet hardware within diagnostic tool 10 is initialized by diagnostic tool 10.

In a block 112, diagnostic tool 10 checks the connection between diagnostic tool 10 and printer 26 by reading the LINK status register of Ethernet controller 33 (shown in FIG. 3). Detecting an affirmative value for "LINK" within the LINK status register validates printer 26 is properly connected to diagnostic tool 10 and a valid LINK has been established. Diagnostic tool 10 will monitor the LINK activity for a predetermined amount ("X") seconds. If no LINK is detected the firmware will timeout, as illustrated by block 113, and a message will be displayed on display 11 of diagnostic tool 10 telling the user to verify the cable connection, power, etc.

When a LINK is detected, in a block 114, diagnostic tool 10 listens in a promiscuous mode for any packets being sent from printer 26 in order to obtain an IP address and a media access control (MAC) address for printer 26. These two addresses give diagnostic tool 10 sufficient information to open a transmission control protocol/internet protocol (TCP/IP) connection with printer 26.

If no packet is received with a predetermined time, in a block 115, diagnostic tool 10 invokes printer 26 to send a packet. Diagnostic tool 10 performs the invocation by sending out an internet group management protocol (IGMP) Group Query Packet. Printer 26 responds to the IGMP Group Query Packet if it has a valid IP address already configured. From the response, diagnostic tool 10 can determine an IP address and a MAC address for printer 26.

Once diagnostic tool 10 has received a packet from printer 26, in a block 116, diagnostic tool 10 stores the obtained MAC address.

In a block 117, diagnostic tool 10 checks to see if the packet received from printer 26 is a dynamic host configuration protocol (DHCP) packet. If the packet is a DHCP packet, this means printer 26 is configured to obtain network settings from a DHCP Server.

If the packet is a DHCP packet, diagnostic tool 10 needs to act as a DHCP Server to assign an IP address to printer 26. In a block 118, diagnostic tool 10 acts as a DHCP server and uses DHCP protocol to assign an IP address to printer 26.

If the packet is not a DHCP packet, in a block 119, diagnostic tool 10 decodes the packet and checks to see if the packet contains a valid IP address and a valid MAC address that can be used to create a TCP/IP session. If the packet does not have a valid IP address, diagnostic block repeats block 114.

If the packet does have a valid IP address, in a block 120, diagnostic tool 10 assigns an IP address to diagnostic tool 10 that has the exact same upper 24 bits as the IP address of printer 26 and has a lower 8 bits that differ from the lower 8 bits of the IP address of printer 26 by the value "1". This will allow diagnostic tool 10 to communicate with printer 26 regardless of the Subnet Mask or Gateway settings of printer 26.

In a block 121, diagnostic tool 10 verifies that a TCP/IP connection can be established by sending an address resolution protocol (ARP) request to printer 26. If no ARP response is returned by printer 26, in a block 122, diagnostic tool exits the test indicating to the user a test failure has occurred.

If in block 121, an ARP response is returned by printer 26, this means that diagnostic tool 10 and printer 26 can communicate. In a block 123, diagnostic tool notes that device connection, discovery and configuration is complete.

In a block 124, diagnostic tool 10 opens a TCP/IP connection with printer 26. In a block 125, diagnostic tool 10 sends a test file to printer 26 using TCP/IP protocols. In a block 126, diagnostic tool 10 closes the TCP/IP connection with printer 26. In a block 127, the test is complete.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A diagnostic tool that verifies correct operation of printers, the diagnostic tool comprising:
   an Ethernet connector;
   a display; and,
   a processor that causes menus to be shown on the display, the menus allowing a user to select a printer type to be tested and to select which tests are to be performed on a printer of the selected printer type, the tests including:
   an Ethernet test;

wherein in preparation for the Ethernet test in which testing for Ethernet functionality is performed, an Ethernet port of the printer and the Ethernet connector are directly connected so that there is no Ethernet network switch connected between the Ethernet port of the printer, and the Ethernet connector, and when the Ethernet test is started, the diagnostic tool discovers network settings of the printer, configures an Ethernet connection between the diagnostic tool and confirms Ethernet functionality of the Ethernet port by transferring over the Ethernet connection a test file to be printed by the printer.

2. A diagnostic tool as in claim 1 wherein, the menus include a select product menu and a select test menu.

3. A diagnostic tool as in claim 1 wherein the printer is configured to obtain network settings from a dynamic host configuration protocol (DHCP) server, the printer uses DHCP protocol to assign an internet protocol (IP) address to the printer.

4. A diagnostic tool as in claim 1 wherein once an internet protocol (IP) address for the printer is known by the diagnostic tool, the diagnostic tool assigns itself an IP address with an upper 24 bits that is identical to an upper 24 bits of the IP address for the printer.

5. A diagnostic tool as in claim 1 wherein once an internet protocol (IP) address for the printer is known by the diagnostic tool, the diagnostic tool assigns itself an IP address with an upper 24 bits that is identical to an upper 24 bits of the IP address for the printer, the IP address the diagnostic tool assigns itself having a lower 8 bits that differ from a lower 8 bits of the IP address for the printer by a value of 1.

6. A method by which a diagnostic tool performs an Ethernet test of a device under test, the method comprising:
    connecting an Ethernet connector of the diagnostic tool to an Ethernet port of the device under test so that there is no Ethernet network switch connected between the Ethernet port of the device under test and the Ethernet connector;
    listening for any packets from the device under test;
    upon receiving a packet from the device under test, determining whether the received packet is a dynamic host configuration protocol (DHCP) packet;
    obtaining an internet protocol (IP) address for the device under test from the received packet when the received packet is not a DHCP packet; and,
    assigning an IP address to the device under test when the received packet is a DHCP packet; and,
    sending a test file between the diagnostic tool and the device under test to confirm Ethernet functionality.

7. A method as in claim 6 wherein listening for any packets from the device under test includes the following:
    after a predetermined period in which no packet is received from the device under test, sending an internet group management protocol (IGMP) Group Query Packet to the device under test to invoke the device under test to send a response packet.

8. A method as in claim 6 additionally comprising the following:
    verifying the IP address for the device under test by sending an address resolution protocol (ARP) request to the device under test.

9. A method as in claim 6 additionally comprising the following:
    verifying the IP address for the device under test by sending an address resolution protocol (ARP) request to the device under test; and,
    opening a transmission control protocol/internet protocol (TCP/IP) connection between the diagnostic tool and the device under test.

10. A method as in claim 6 additionally comprising the following:
    opening a transmission control protocol/internet protocol (TCP/IP) connection between the diagnostic tool and the device under test; and,
    sending a test file to the device under test via TCP/IP protocol.

11. A method as in claim 6 additionally comprising the following performed after an IP address for the device under test is known:
    assigning the diagnostic tool an IP address with an upper 24 bits that is identical to an upper 24 bits of the IP address for the device under test.

12. A method as in claim 6 additionally comprising the following performed after an IP address for the device under test is known:
    assigning the diagnostic tool an IP address with an upper 24 bits that is identical to an upper 24 bits of the IP address for the device under test and with a lower 8 bits that differ from a lower 8 bits of the IP address for the device under test by a value of 1.

13. A diagnostic tool comprising:
    means for connecting to an Ethernet port of the device under test so that there is no Ethernet network switch connected between the Ethernet port of the device under test and the diagnostic tool;
    means for receiving packets from a device under test;
    means for processing a packet received from the device under test, the means for processing a packet determining whether the received packet is a dynamic host configuration protocol (DHCP) packet, and the means for processing the packet assigning an IP address to the device under test when the received packet is a DHCP packet;
    means for obtaining an internet protocol (IP) address for the device under test from the received packet when the received packet is not a DHCP packet; and,
    means for sending a test file between the diagnostic tool and the device under test to confirm Ethernet functionality.

14. A diagnostic tool as in claim 13 wherein the means for processing the packet assigns the diagnostic tool an IP address with an upper 24 bits that is identical to an upper 24 bits of the IP address for the device under test.

15. A diagnostic tool as in claim 13 wherein the means for processing the packet assigns the diagnostic tool an IP address with an upper 24 bits that is identical to an upper 24 bits of the IP address for the device under test and with a lower 8 bits that differ from a lower 8 bits of the IP address for the device under test by a value of 1.

16. A diagnostic tool as in claim 13 wherein the means for receiving includes a means for sending an internet group management protocol (IGMP) Group Query Packet to the device under test after a predetermined period in which no packet is received from the device under test.

17. A diagnostic tool as in claim 13 additionally comprising:
    means for verifying the IP address for the device under test by sending an address resolution protocol (ARP) request to the device under test.

18. A diagnostic tool as in claim 13 additionally comprising:

means for verifying the IP address for the device under test by sending an address resolution protocol (ARP) request to the device under test; and, means for opening a transmission control protocol/internet protocol (TCP/IP) connection between the diagnostic tool and the device under test.

19. A diagnostic tool as in claim 13 additionally comprising:

means for opening a transmission control protocol/internet protocol (TCP/IP) connection between the diagnostic tool and the device under test; and, means for sending a test file to the device under test via TCP/IP protocol.

20. A method for testing functionality of a printer, the method comprising:

connecting a diagnostic tool to the printer, including connecting an Ethernet connector of the diagnostic tool to an Ethernet port of the printer so that there is no Ethernet network switch connected between the Ethernet port of the printer and the Ethernet connector;

using menus displayed by the diagnostic tool to select a type of printer to be tested and to select an Ethernet test;

discovering, by the diagnostic tool; network settings of the printer;

configuring, by the diagnostic tool, an Ethernet connection between the diagnostic tool and the printer;

testing the Ethernet connection by sending a test file from the diagnostic tool to the printer; and, printing the test file.

21. A method as in claim 20 wherein configuring the Ethernet connection includes:

using DHCP protocol, by the diagnostic tool, to assign an internet protocol (IP) address to the printer when the printer is configured to obtain network settings from a dynamic host configuration protocol (DHCP) server.

22. A method as in claim 20 wherein configuring the Ethernet connection includes:

the diagnostic tool assigning itself an IP address with an upper 24 bits that is identical to an upper 24 bits of the IP address for the printer.

23. A method as in claim 20 wherein configuring the Ethernet connection includes:

the diagnostic tool assigning itself an IP address with an upper 24 bits that is identical to an upper 24 bits of the IP address for the printer and with a lower 8 bits that differ from a lower 8 bits of the IP address for the printer by a value of 1.

* * * * *

UNITED STATES PATENT AND TRADEMARK OFFICE
CERTIFICATE OF CORRECTION

PATENT NO. : 7,398,428 B2
APPLICATION NO. : 10/935550
DATED : July 8, 2008
INVENTOR(S) : David G. Hille Page 1 of 1

It is certified that error appears in the above-identified patent and that said Letters Patent is hereby corrected as shown below:

In column 5, line 5, in Claim 1, after "printer" delete ",".

In column 5, line 39, in Claim 6, delete "uhder" and insert -- under --, therefor.

In column 7, line 24, in Claim 20, delete "tool;" and insert -- tool, --, therefor.

Signed and Sealed this

Fourteenth Day of October, 2008

JON W. DUDAS
*Director of the United States Patent and Trademark Office*